Figures 1, 2:
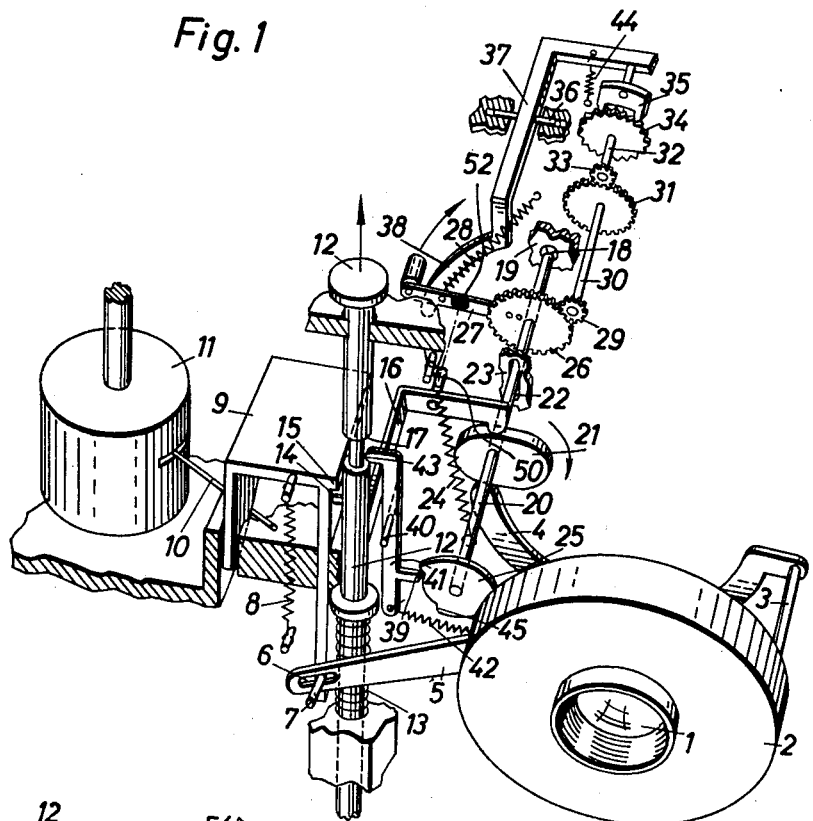

June 15, 1965  F. JAKOB  3,188,933
AUTOMATIC CAMERA WITH SELF-TIMER
Filed April 30, 1962

INVENTOR.
FRANZ JAKOB
BY
Michael S. Striker
Attorney

United States Patent Office 3,188,933
Patented June 15, 1965

3,188,933
AUTOMATIC CAMERA WITH SELF-TIMER
Franz Jakob, Unterhaching, near Munich, Germany, assignor to Agfa Aktiengesellschaft, Leverkusen-Bayerwerk, Germany
Filed Apr. 30, 1962, Ser. No. 191,363
Claims priority, application Germany, Apr. 29, 1961, A 37,317
12 Claims. (Cl. 95—53.6)

The present invention relates to cameras and in particular to automatic cameras which are capable of automatically setting the camera in accordance with the lighting conditions.

Cameras both of the automatic and non-automatic type generally include a self-timer which enables the tripping of the shutter to be delayed for a predetermined number of seconds so that the operator may, for example, include himself in the photograph. Where such a self-timer is included in a non-automatic camera, it is sufficient if the self-timer simply delays the release of the shutter for a given period of time. However, when the self-timer is included in an automatic camera, more is required since it is also necessary to maintain the automatic setting of the camera during the period when the actuation of the shutter is delayed by the self-timer. Of course, it is also possible to provide a self-timer which will delay actuation of the structure for automatically setting the camera until just before the shutter is released, but the only advantage to be derived from a structure of this type is that it will be possible to take into account any changes in the lighting conditions which occur during the delay period provided by the self-timer. In practice, such changes will almost never occur, and the delay of the actuation of the structure for automatically setting the camera prevents automatic setting of the camera in the immediate vicinity of the subject which is being photographed, so that this latter type of camera setting, which is more accurate under certain conditions, cannot be provided where the self-timer delays not only actuation of the shutter but also actuation of the automatic setting of the camera.

It is, therefore, a primary object of the present invention to provide an automatic camera with a self-timer structure which will not only delay actuation of the shutter for a given period of time but which will also be able to maintain the automatic setting of the camera during the delay period.

Another object of the present invention is to provide a camera of the above type where cocking of the self-timer structure will automatically actuate the structure for maintaining the automatic setting of the camera during the period when actuation of the shutter is delayed.

A further object of the present invention is to provide a structure of the above type where the self-timer means, when it is set by the operator in its operative position, will reliably prevent actuation of the shutter for a given period of time and will also prevent the automatic setting structure of the camera from returning to an inoperative position after the operator has actuated the structure which normally would provide an exposure.

A still further object of the present invention is to provide a structure where a simple change in the position of certain driving elements, in response to setting of the self-timer by the operator in an operative position, will produce the results of maintaining the automatic setting of the camera as well as delaying the release of the shutter.

An additional object of the present invention is to provide a structure capable of accomplishing the above objects and at the same time being exceedingly simple, compact, and reliable in operation.

The objects of the present invention also include the provision of a self-timer structure where the self-timer is easily moved to its cocked position by automatically displacing an anchor of an escapement mechanism away from an escapement wheel of this mechanism.

With the above objects in view the invention includes, in a camera, an automatic setting means for automatically setting the camera in accordance with the lighting conditions, as well as a shutter release means for releasing the shutter of the camera, and a manually operable means capable of being actuated by the operator and cooperating with the automatic setting means and with the shutter release means for releasing the automatic setting means to automatically set the camera and for then actuating the shutter release means to release the shutter of the camera to make an exposure. In accordance with the present invention a self-timer means is capable of being moved, at the option of the operator, between an inoperative position where it does not influence the operation of the camera and an operative position where the self-timer means cooperates on the one hand with the shutter release means to delay actuation thereof by the manually operable means for a given period of time and on the other hand with the automatic setting means for maintaining the automatic setting provided by the latter during the period when actuation of the shutter release means is delayed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which one possible embodiment of a structure according to the present invention is shown in a perspective view, the drawings showing only enough structure to provide a full understanding of the invention. In the drawings:

FIG. 1 is a partly sectional, partly diagrammatic perspective illustration of one embodiment of the structure of the invention; and FIG. 2 is a perspective fragmentary view illustrating structure for releasably holding the self-timer means in its cocked position.

In FIG. 1 of the drawings is illustrated the objective 1 of a still camera, although it is to be understood that the structure of the invention is equally applicable to a motion picture camera. The objective 1 is surrounded by a housing 2 in which is housed in a purely conventional manner the shutter as well as the diaphragm of the camera. The shutter of the camera is actuated by the turning of a shaft 3 which projects rearwardly out of the housing 2, and an elongated arcuate plate 4 is fixed at one end to the shaft 3 and is located in a plane normal to the optical axis, this plate 4 when turned downwardly at its free end distant from the shaft 3 turning the latter to release the shutter and thus make an exposure. The particular shutter located in the housing 2 is a conventional shutter which does not require any special shutter-cocking lever, the cocking of the shutter taking place in a well-known manner automatically in response to movement of the lever which advances the next film frame into position to be exposed. However, if desired, a separate shutter-cocking lever may be provided, and in this case the turning of the shaft 3 by downward movement of the plate 4 would release the shutter. Of course, such a shutter-cocking lever may be connected to the film-advancing lever so as to provide cocking of the shutter when the film is advanced. In addition, a lever 5 is operatively connected to structure within the housing 2 for determining the extent to which film will be exposed. Thus, the turning of the lever 5 can result, in a well-known manner, in setting of the diaphragm of the camera as well as in setting of the exposure time. The particular manner in which the diaphragm and exposure time are set forms no part of the present invention. The lever 5 is formed with a slot 6 which receives a pin 7 fixed to a scanning member 9 which is guided for vertical movement and which is urged downwardly by a spring 8, and in accordance with the elevation of the scanning member 9, the lever 5 will have an angular position providing a given exposure value for the camera. The automatic setting means of the camera includes, in addition to the parts 5–9, a galvanometer 11 adapted to be actuated through a photocell or through a photosensitive electrical resistor, in a well-known manner, and the pointer 10 of the galvanometer will thus assume an angular position which is indicative of the lighting conditions, and is well-known in the art. Of course, the scanning edge of the scanning member 9 which engages the pointer 10 during downward movement of the scanning member 9 is inclined so as to provide different elevations for the scanning member 9 in accordance with the angular position of the pointer 10, all of which is well-known in the art. Thus, the parts 5–11 form an automatic means for automatically setting the camera in accordance with the lighting conditions, while the parts 3, 4 form a shutter release means for releasing the shutter of the camera when this shutter release means is actuated.

A manually operatble means cooperates both with the automatic setting means 5–11 and with the shutter release means 3, 4 for releasing the automotic setting means to automatically set the camera and for then actuating the shutter release means to make an exposure. This manually operable means includes the elongated rod 12 which is guided by suitable parts of the camera for vertical movement and which has an upper starting position from which it is moved downwardly by the operator toward a given end position. The rod 12 is acted upon by a spring 13 which urges it upwardly to its rest position, this rest position being the starting position from which the operator moves the rod 12 downwardly, and the manually operable means includes a pin 14 which is fixed to the rod 12 for movement therewith and which extends beneath a projecting portion 15 of the scanning member 9. Thus, when the operator depresses the rod 12 the pin 14 will move downwardly and then the scanning member 9, under the action of the spring 8, will follow the pin 14 downwardly until the scanning edge of the scanning member 9 engages the pointer 10. In addition, the manually operable means includes an elongated rigid arm 16 which is fixed to and extends from the rod 12. For a purpose which is described below, the rod 12 is formed with a cutout 17 which provides in the elongated member 12 a space which is adapted to receive the free end of a pawl means for a purpose described below.

A wall 19 of the camera carries in a recess thereof a ball member 18 which is engaged by the free end of an elongated cam shaft 20, so that the parts 18, 19 form a support means which supports the cam shaft 20 for turning movement, and this cam shaft 20 carries a cam 21 which forms a cam means for actuating the shutter release means 3, 4. The camera housing also includes a wall 23 formed with a slot 22 through which the shaft 20 extends, so that in this way the shaft 20 is guided for tilting movement downwardly from and upwardly toward a rest position of the cam shaft 20. A spring 24 is operatively connected to the cam shaft 20 to urge the latter to turn upwardly to its rest position. In addition to carrying the cam means 21 which actuates the shutter release means 3, 4, in a manner described below, the cam shaft 20 carries a second cam means in the form of a cam 25 which cooperates with the pawl means formed by the lever 41, in a manner described below, and in addition the cam shaft 20 fixedly carries a gear 26 which forms part of the self-timer means. A lever 27 is accessible to the operator and is fixed to the gear 26 for setting the self-timer means in its operative position, the self-timer means normally remaining in an inoperative position, and a spring 28 is connected to the manually turnable lever 27 for acting on the latter to cause the self-timer means to run down and return to its rest position after the self-timer means has been placed by the operator in its operative position.

The self-timer means includes in addition to the parts 26–28, a pinion 29 meshing with the gear 26 and fixedly carried by a shaft 30 which is supported in any suitable way for rotary movement, and the end of the shaft 30 distant from the pinion 29 fixedly carries a gear 31 which meshes with a second pinion 33 which is carried by a second shaft 32 which is also supported for rotary movement by any stationary bearing structure of the camera. The shaft 32 fixedly carries an escapement wheel 34 with which an escapement anchor 35 cooperates so that the running down of the self-timer means by the spring 28 is retarded by the escapement mechanism 34, 35, and the anchor 35 is pivotally carried by a pin which is fixed to a lever 37 which is itself supported by a pivot pin 36 for turning movement about a horizontal axis which extends across the optical axis, a spring 44 acting on the lever 37 to urge the latter in the direction which places the anchor 35 in engagement with the escapement wheel 34. The lever 37 has a forwardly curved free end portion 38 which extends beneath the lever 27, so that when the latter is turned in a counterclockwise direction, as viewed in the drawing, to a position which will render the self-timer means operative, the lever 27 will engage the end 38 of the lever 37 to turn the lever 37 in opposition to the spring 44 to a position displacing the anchor 35 away from the escapement wheel 34, so that in this way the setting of the self-timer means in its operative position will not be retarded by the escapement mechanism.

The pawl means formed by the lever 41 is pivotally supported by a stationary pivot pin 40 carried by any suitable stationary part of the camera and extending parallel to the optical axis, and the lever 41 has a projection 39 which engages and cooperates with the cam 25, a spring 42 being operatively connected to the lever 41 for maintaining the projection 39 in engagement with the cam 25. The lever 41 has at its upper end a projecting portion 43 which forms a pawl tooth and which is adapted to enter into the cutout 17 of the rod 12 under conditions described below.

In the position of the parts shown in the drawing, the operator has already turned the lever 27 in a counterclockwise direction in opposition to the spring 28, thus engaging the end 38 of the lever 37 with the lever 27 and raising the anchor 35 away from the escapement wheel 34, to the cocked position of the self-timer means where the self-timer means has been placed by the operator in an operative position, the self-timer means being releasably maintained in this operative position in opposition to the spring 28 by any suitable release structure, such as that shown most clearly in FIG. 2. Thus, as may be seen from FIG. 2 the arm 16 which is fixed to the rod 12 fixedly carries a hollow tube 50 which at its end wall distant from the arm 16 is formed with an opening through which the tapered free end of an elongated pin 51 passes, this tapered free end of the pin 51 being too large rearwardly of its tip to pass completely through the opening in this end wall of the tube 50. A spring 55 in the tube 50 presses the pin 51 to the right, as viewed in FIG. 2. The free end of the pin 51 is in the path of downward movement of the lever 27 which is formed with an opening 52, and the free end of the pin 51 has an upper inclined face 54 which is inclined downwardly toward the tip of the pin 51 and a second inclined face 53 which is inclined downwardly away from the tip of the rod 51. Thus, when the lever 27 is moved in opposition to the spring 28 to the cocked position shown in FIG. 2 the bottom edge of the lever 27 will engage the inclined surface 54 and move the pin 51 rearwardly in the tube 50 in opposition to the spring 55, and the downward movement of the lever 27 will continue until the pin 51 snaps into the opening 52, the spring 55 being strong enough to retain the arm 27 in its cocked position in opposition to the spring 28. This releasable holding structure of FIG. 2 which releasably holds the self-timer means in its operative, cocked position is actuated to release the self-timer means for operation when the operator depresses the rod 12 of the manually operable means. The downward movement of the rod 12 by the operator causes the lower inclined face 53 at the free end of the pin 51 to slide with respect to the lower edge of the slot 52 so that the pin 51 is again moved in opposition to the spring 55 inwardly into the tube 50, and in this way the free end of the pin 51 is moved out of the slot 52 so as to release the lever 27 to the spring 28. Thus, under the conditions shown in the drawing the operator has elected to use the self-timer means in order to delay actuation of the shutter release means 3, 4, and thus the operator has placed the self-timer means in its operative position shown in the drawing.

When the operator depresses the rod 12 of the manually operable means, in opposition to the spring 13, the arm 16 which is fixed to the rod 12, as described above, engages the cam 21 and moves the latter together with the cam shaft 20 in opposition to the spring 24 downwardly away from the rest position of the cam shaft 20, so that the cam 21 approaches and becomes located closely adjacent to the plate 4 of the shutter release means 3, 4. As was described above, the downward movement of the rod 12 results in downward movement of the pin 14 so that in this way the automatic setting means is released and the spring 8 moves the scanning member 9 downwardly until its scanning edge engages the pointer 10, and through the transmission 6, 7 the lever 5 will be turned to automatically set the structure of the camera which determines the extent to which film therein is exposed. The turning of the lever 27 downwardly in order to place the self-timer means in its operative position results, of course, in turning of the cam shaft 20, so that when the lever 27 is turned by the operator to cock the self-timer means the cams 21 and 25 will assume predetermined angular positions different from those which they have when the self-timer means is in its inoperative position with the lever 27 as well as the gear 26 displaced in a clockwise direction from the position of these parts shown in the drawing. The angular position in which the cam 25 is thus placed by turning of the lever 27 is such that this cam 25 will enable the spring 42 to turn the pawl means 41 about the pivot 40 in a counterclockwise direction, as viewed in the drawing, to a position where the projection or pawl tooth 43 will enter into the annular groove or cutout 17 of the rod 12 when the latter is moved downwardly from its starting position toward its lower end position, and thus the setting of the self-timer means in its operative position places the cam 25 and the lever 41 in such a position that the projection 43 will enter into the cutout 17 when the rod 12 is depressed, and as a result the rod 12 cannot be returned by the spring 13 upwardly back to its starting position until the lever 41 is turned in a clockwise direction to displace the projection 43 out of the cutout 17. Therefore it is clear that the cam 45 and the lever 41 forms a releasable holding means which is actuated by the self-timer mean for releasably holding the rod 12 in its depressed position, and since in this depressed position the spring 8 maintains the scanning member 9 in engagement wtih the pointer 10, it is clear that the automatic setting means will be maintained in the position where it provides the automatic setting of the camera, in accordance with the lighting conditions, until the projection 43 moves out of the cutout 17.

During the running down of the self-timer means by the spring 28 thereof the lever 27 moves away from the portion 38 of the lever 37 during the initial turning movement of the lever 27, so that the anchor 35 moves into engagement with the escapement wheel 34, and now the escapement mechanism 34, 35 delays the running down of the self-timer means by its spring 28 to provide a predetermined period of running down. It is the spring 44 which turns the lever 37 to place the anchor 35 in engagement with the escapement wheel 34 when the lever 27 is released to be turned by the spring 28. The parts are so designed that when the lever 27 and the gear 26 and shaft 20 therewith have turned through approximately 90°, the self-timer means will have run down. Of course, the cam 25 will also turn through approximately 90° at this time. The portion of the cam 21 which is most distant from the shaft 20 is located to the right of the shaft 20 at substantially the same elevation as the shaft 20 when the self-timer means is in its cocked position shown in the drawing, and thus the clockwise turning of the shaft 20 through approximately 90° during running down of the self-timer means will cause the cam 21 to engage and turn the lever or plate 4 so as to turn the shaft 3 and release the shutter at approximately the end of the running down period of the self-timer means. The angular positions of the cams 25 and 21 with respect to each other are such that immediately after the cam 21 has actuated the shutter release means 3, 4 so as to release the shutter to make an exposure, the edge portion 45 of the cam 25 will engage the portion 39 of the lever 41 to turn the latter in opposition to the spring 42 in a clockwise direction displacing the projection 43 out of the cutout 17. The portion of the cam 25 which extends between that part thereof shown in the drawing engaging the projection 39 and the edge portion 45 thereof extends along a circle whose center is in the shaft 20, so that during the running down of the self-timer means accompanied by clockwise turning of the shaft 20 there will be no turning of the lever 41 until the edge portion 45 of the cam 25 engages the projection 39 to turn the lever 41 in opposition to the spring 42. As soon as the projection 43 of the pawl means 41 moves out of the cutout 17 the spring 13 returns the manually operable means to its rest position, and the spring 13 is of course stronger than the spring 8 so that the pin 14 engages the projection 15 of the scanning member 9 to raise the latter in opposition to the spring 8 to the rest position of the automatic setting means where the pointer 10 is again free to turn to whatever position it happens to take in accordance with the lighting conditions. Of course, during return of the manually operable means to its starting position, the arm 16 will move upwardly with the rod 12 so that the spring 24 will raise the cam shaft 20 to its starting position, the cam 21 following the arm 16 at this time.

When the cam shaft 20 is displaced in the clockwise direction to approximately 90° from the position thereof shown in the drawing, the self-timer means is in its inoperative position where it will have no influence on the operation of the camera. The cams 21 and 25 will of course be angularly displaced also by 90° from the positions thereof shown in the drawing at this time, and thus when the cam shaft 20 is moved downwardly in opposition to the spring 24 during the next actuation of the rod 12, the edge portion 45 of the cam 25 will engage the projection 39 of the lever 41 so as to maintain the portion 43 thereof out of the cutout 17, and thus the releasable holding means 25, 41 will at this time have no influence on the operation. Also, when the self-timer means is in its inoperative position the part of the cam 21 which is most distant from the shaft 20 is located substantially directly beneath the shaft 20, so that at this time when the rod 12 is moved down the arm 16 will also move the cam 21 downwardly tilting the cam shaft 20 downwardly and also turning the plate 4 so as to actuate the shutter release means to release the shutter just before the rod 12 reaches the end of its downward movement. Of course, before the rod 12 reaches the end of its downward movement the automatic setting means 5–11 will have already automatically set the camera in accordance with the lighting conditions, so that the exposure will be made with the camera properly set in an automatic manner. Therefore, when the self-timer means is in its inoperative position it has no influence on the operation of the camera and the operator by actuating the manually operable means 12, 14, 16 will first release the automatic setting means to automatically set the camera and will immediately thereafter actuate the shutter release means 3, 4 to release the shutter and make an exposure. It will be noted that the bringing of the self-timer means into its operative position by turning of the lever 27 requires only the turning of the cam shaft 20 and the cams 21 and 25 therewith in order to place the apparatus in a position where the self-timer means will, in accordance with the invention, not only delay actuation of the shutter but also will maintain the automatic setting of the camera.

Of course, many variations in the details of the above-described structure are possible in accordance with the invention. For example, instead of a turnable shaft 3 to release the shutter and instead of a vertically movable rod 12 to initiate the operation of the camera structure to make an exposure, it is possible to provide turnable levers, for example. Moreover, it is not absolutely essential that the anchor 35 be moved away from the escapement wheel 34. The lever 27 could still be turned to place the self-timer means in its operative position even if the escapement wheel 34 remains in engagement with the escapement anchor 35, and the movement of the latter away from the former by the structure of the invention only makes it easier to turn the lever 27 to set the self-timer means in its operative position as well as quicker, so that for these reasons the turnable lever 37 cooperating with the lever 27 and the anchor 35 in the manner described above is preferred, although it is not absolutely essential. Moreover, the particular step-down transmission disclosed for the self-timer means can be varied so as to have, for example, additional step-down transmission elements, if desired. The number of step-down stages can of course be varied. Furthermore, instead of providing a cam shaft 20 which is angularly tiltable, it is possible to provide a cam shaft 20 which is maintained at all times with its axis stationary, but which while capable of turning about its axis is also shiftable along its axis instead of being tiltable as described above. For this purpose it is only necessary that the turning of the lever 27 actuate a suitable threaded structure, for example, so as to axially shift the shaft 20 to a position where the cam 21 will cooperate with the plate 4 when the self-timer means is placed in its operative position. With such an arrangement, after the shutter has been tripped, but before the termination of the running down of the self-timer means, the same threaded structure will return the shaft 20 axially to its starting position where the cam 21 is displaced rearwardly of the plate 4. With such a construction, the tripping of the shutter when the camera is operated without using the self-timer means will be provided by an additional motion transmitting element such as a lever freely turnable on the shaft 20 and aligned with the plate 4 and the arm 16 when the shaft 20 is in its retracted condition where the cam 21 cannot cooperate with the plate 4, and such a lever can be turned during depression of the rod 12 by the arm 16 so as to actuate the shutter release means in the case where the cam shaft 20 is supported only for axial movement and for rotary movement about its own axis. The cam 25 can, with such a construction, be made so thick that its axial length equals the distance by which the shaft 20 is displaced between its retracted position and its forward position where the cam 21 cooperates with the plate 4, so that at all times the cam 25 will cooperate with the lever 41 to provide an operation as described above. It is also possible to provide a construction where the self-timer means is actuated each time the manually operable means 12, 14, 16 is actuated by the operator to make an exposure, but where the anchor 35 is placed in engagement with the escapement wheel 34 only when the self-timer means is rendered operative, so that with such construction the gearing of the self-timer means can turn freely when the camera is to be operated without any delay.

In order to prevent the self-timer means of the structure shown in the drawing and described above from operating, after it has been cocked, until the rod 12 is depressed by the operator, the shaft 20 may carry a disc of a configuration similar to the cam 25 and a lever similar to the lever 41 may cooperate with such a disc in the manner of a pawl and ratchet to prevent turning of the shaft 20 by the spring 28 after the lever 27 has been turned downwardly to place the self-timer means in its operative condition. The rod 12 would then carry a projection which would engage such a lever to displace it from the disc so as to release the self-timer means upon depression of the rod 12, and in this way the self-timer means can be set into operation after it is cocked only upon downward movement of the rod 12.

It will be noted that the rod 12 of the manually operable means of the structure of the invention as well as the scanning member 9 and the lever 5 of the automatic setting means of the structure of the invention all are held in the position shown in the drawing by operation of the projection 43 with the cutout 17, so as to maintain the automatic setting during the delay period provided by the self-timer means, and this result can also be achieved by providing a pawl means which instead of cooperating with the rod 12 cooperates with the scanning member 9 or with the lever 5, so that by cooperation of the releasable holding means 25, 41 with any of the elements of the automatic setting means or the manually operable means which are displaced during automatic setting of the camera it is possible to retain this automatic setting during the period when the self-timer means runs down.

It is pointed out, however, that the particular structure shown in the drawing and described above is preferred to any of the above-described variations because of the simplicity and ruggedness of the structure shown in the drawing and described above.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, automatic means for automatically setting the camera to make an exposure in accordance with the lighting conditions; release means for releasing a shutter of the camera to make an exposure; manually operable means cooperating with said automatic setting means and with said release means for actuating said automatic setting means to automatically set the camera in accordance with the lighting conditions and for actuating said release means to release the shutter to make an exposure after the camera has been automatically set according to the lighting conditions by said automatic setting means; self-timer means movable, at the option of the operator, between an inoperative position where it has no influence on the operation of the camera and an operative position where said self-timer means cooperates with said manually operable means and said release means to delay actuation of said release means by said manually operable means for a predetermined period of time; and means, actuated by said self-timer means when the latter is placed by the operator in its operative position, for holding the setting of the camera, made by said automatic setting means, during the time when said self-timer means delays actuation of said release means.

2. In a camera, in combination, automatic setting means for automatically setting the camera to make an exposure in accordance with the lighting conditions; shutter release means for releasing a shutter of the camera to make an exposure; manually operable means cooperating with said automatic setting means and with said shutter release means for actuating said automatic setting means to set the camera in accordance wih the lighting conditions and for then actuating said shutter release means to release the shutter of the camera to make an exposure, said manually operable means and said automatic setting means including a plurality of elements which participate in the automatic setting of the camera; self-timer means movable by the operator between an inoperative position where said self-timer means has no influence on the operation of the camera and an operative position where said self-timer means cooperates with said shutter release means to delay actuation thereof by said manually operable means for a predetermined period of time; and releasable holding means associated by said self-timer means when the latter is placed by the operator in its operative position and cooperating with one of said elements for releasably maintaining the latter in the position it takes when the camera has been automatically set by said automatic setting means until the delay of the actuation of said shutter release means by said self-timer means has terminated.

3. In a camera, in combination, automatic setting means for automatically setting the camera according to the lighting conditions; shutter release means for releasing a shutter of the camera to make an exposure; manually operable means cooperating with said automatic setting means and said shutter release means and movable by the operator from a given starting position toward a given end position for releasing said automatic setting means so that the latter will automatically set the camera and for then actuating said shutter release means to actuate the camera shutter to make an exposure; self-timer means movable, at the option of the operator, between an inoperative position where it has no influence on the operation of the camera and an operative position where said self-timer means delays actuation of said shutter release means by said manually operable means for a given period of time during which self-timer means runs down; and releasable holding means actuated by said self-timer means only when the latter is placed by the operator in its operative position and cooperating with said manually operable means for preventing return thereof to said starting position for a period of time approximately equal to the period of time required for said self-timer means to run down.

4. In a camera, in combination, automatic setting means for automatically setting the camera in accordance with the lighting conditions; shutter release means for releasing a shutter of the camera to make an exposure; manually operable means cooperating with said automatic setting means and said shutter release means to release said automatic setting means for automatically setting the camera and to then actuate said shutter release means for making an exposure, said manually operable means and said automatic setting means including a plurality of elements which participate in the automatic setting of the camera and which will have certain positions when the camera has been automatically set; self-timer means movable at the option of the operator between an inoperative position where it does not participate in the operation of the camera and an operative position where said self-timer means cooperates with said shutter release means to delay actuation thereof by said manually operable means for a given period of time; a pawl cooperating with one of said elements when said pawl engages said one element to hold said element in the position it takes when the camera has been automatically set; and cam means cooperating with said pawl for moving the latter between positions where it engages and where it is disengaged from said one element, said self-timer means cooperating with said cam means to actuate the latter to place said pawl in engagement with said one element when said self-timer means is moved by the operator to said operative position thereof and said cam means being actuated thereafter by said self-timer means to turn said pawl away from said one element after said given period of time during which actuation of said shutter release means was delayed by said self-timer means.

5. In a camera, in combination, automatic setting means for automatically setting the camera according to the lighting conditions; shutter release means for releasing a shutter of the camera to make an exposure; manually operable means cooperating with said automatic setting means and with said shutter release means for releasing said automatic setting means to automatically set the camera and for then actuating said shutter release means to make an exposure when said manually operable means is actuated by the operator, said manually operable means including an elongated member which is moved by the operator from a given starting position toward a given end position upon actuation of said manually operable means, and said elongated member having a portion formed with a cutout; pawl means turnable between a position where it is located in said cutout to prevent return of said elongated member to said starting position thereof so as to maintain said manually operable means in the position where said automatic setting means maintains the automatic setting of the camera; and self-timer means movable by the operator between an inoperative position where it does not participate in the operation of the camera and an operative position where it cooperates with said shutter release means and said manually operable means to delay actuation of said shutter release means by a given period of time, said self-timer means when it is in its inoperative position maintaining said pawl means out of said cutout and said self-timer means releasing said pawl means for movement into said cutout when said self-timer means is placed by the operator in said operative position thereof, said self-timer means turning said pawl out of said cutout after the given period of time delay provided by said self-timer means.

6. In a camera which is capable of being automatically set in accordance with the lighting conditions, in combination, shutter release means for releasing the shutter of the camera to make an exposure; manually operable means accessible to the operator to be actuated when an exposure is to be made; cam means located between and engaging said manually operable means and said shutter release means for transmitting movement of said manually operable means to said shutter release means to actuate the latter; and self-timer means movable by the operator between an inoperative position where it does not influence the operation of the camera and an operative position where it will delay actuation of said shutter release means for a given period of time, said self-timer means placing said cam means in one position, when said self-timer means is in said inoperative position thereof, where said shutter release means will be actuated from said manually operable means through said cam means immediately when said manually operable means is actuated by the operator, and said self-timer means when it is in its operative position placing said cam means in a second position where said cam means will be actuated by said self-timer means, during running down thereof, to actuate said shutter release means only after said period of time has lapsed after actuation of said manually operable means by the operator.

7. In a camera capable of being automatically set in accordance with the lighting conditions, in combination, shutter release means for releasing the shutter of the camera to make an exposure; an elongated cam shaft; support means supporting said cam shift for tilting movement toward and away from a predetermined rest position; cam means carried by said cam shaft and approaching said shutter release means to actuate the same when said shaft is moved away from said rest position thereof; spring means cooperating with said cam shaft for urging the latter to said rest position thereof; manually operable means movable from a given starting position toward a given end position and engaging said cam means to move the latter and said shaft therewith in opposition to said spring means from said rest position of said shaft to place said cam means adjacent said shutter release means for actuating the latter; and self-timer means movable at the option of the operator between an inoperative position where it does not influence the operation of the camera and an operative position where it provides a predetermined delay in the actuation of said shutter release means, said self-timer means cooperating with said cam shaft to control the angular position thereof and said self-timer means when in said inoperative position thereof placing said cam shaft in an angular position where said cam means will actuate said shutter release means during movement of said manually operable means from said starting toward said end position thereof, said self-timer means when moved to said operative position thereof placing said cam shaft in an angular position where said cam means will not actuate said shutter release means during turning of said cam shaft from said rest position thereof upon actuation of said manually operable means, said self-timer means turning said cam shaft during running down of said self-timer means in a direction which actuates said cam means to actuate said shutter release means after said predetermined delay provided by said self-timer means.

8. In a camera capable of being automatically set in accordance with the lighting conditions, in combination, shutter release means for releasing a shutter of the camera; an elongated cam shaft; cam means carried by said cam shaft for actuating said shutter release means when said cam shaft is in a given angular position; and self-timer means cooperating with said cam shaft for controlling the angular position thereof, said self-timer means including a gear fixed to said cam shaft and a manually operable lever operatively connected to said gear for placing said self-timer means either in an inoperative position where said cam means will actuate said shutter release means or in an operative position where said cam means will not actuate said shutter release means until said shaft has been turned by said self-timer means through a given angle; support means supporting said shaft for tilting movement toward and away from a rest position where said cam means is spaced from said shutter release means; and manually operable means cooperating with said cam means for moving the latter and said shaft therewith away from the rest position of said shaft to a position where said cam means will cooperate with said shutter release means.

9. In a camera, in combination, automatic means for automatically setting the camera in accordance with the lighting conditions; shutter release means for releasing a shutter of the camera to make an exposure; manually operable means movable from a given starting position toward a given end position and cooperating with said automatic setting means for releasing the latter to automatically set the camera upon movement of said manually operable means from said starting toward said end position thereof, said manually operable means including an elongated rod moved by the operator and formed with a cutout; pawl means turnable into and out of said cutout, said pawl means when in said cutout preventing return of said rod of said manually operable means to said rest position thereof and thus maintaining said automatic setting means in a position where the camera is automatically set; an elongated cam shaft; support means supporting said cam shaft for tilting movement from a given rest position toward said shutter release means and from the latter back to said rest position; spring means cooperating with said cam shaft for urging the latter to said rest position; first cam means carried by said cam shaft for actuating said shutter release means when said cam shaft is turned toward said shutter release means; second cam means carried by said cam shaft for actuating said pawl means, said manually operable means having a portion which engages said first cam means to move the latter and said cam shaft therewith from said rest position of said cam shaft toward said shutter release means to place said first cam means in an operative position with respect to said shutter release means; and self-timer means including a gear fixed to said cam shaft and a manually operable lever fixed to said gear, said gear and lever placing said cam shaft, when said self-timer means is in an inoperative position, in an angular position where said first cam means will actuate said shutter release means upon actuation of said manually operable means during movement of the latter from said starting toward said end position thereof, and said self-timer means when in said inoperative position thereof placing said second cam means in a position maintaining said pawl means out of said cutout, said lever and said gear therewith being turnable by the operator to a position which renders said self-timer means operative, and said self-timer means when in said operative position thereof placing said cam shaft in an angular position where said first cam means will not actuate said shutter release means upon movement by the operator of said manually operable means from said starting to said end position thereof and where said second cam means will control said pawl means so that the latter will enter into said cutout to prevent return of said manually operable means to said starting position thereof, said self-timer means then, during the period when it runs down, turning said cam shaft to a position where said first cam means will actuate said shutter release means, after a given period of time, and where said second cam means will then move said pawl means out of said cutout so that said manually operable means will return to its starting position.

10. In a camera as recited in claim 9, said automatic setting means including a galvanometer and a galvanometer pointer, a scanning member for scanning the position of said pointer, a spring urging said scanning member into engagement with said pointer, and a pin forming part of said manually operable means and maintaining said scanning member in opposition to said spring in a rest position spaced from said pointer, said pin, during movement of said manually operable means from said starting toward said end position, releasing said scanning member to said spring so that said scanning member will then scan the position of said pointer, said scanning member being operatively connected to a structure which automatically sets the camera elements which determine the extent to which film therein is exposed, whereby as long as said pawl means does not release said manually operable means for return to said starting position thereof said automatic setting means will maintain the camera set for making an exposure in accordance with the lighting conditions.

11. In a camera, in combination, automatic setting means for automatically setting the camera in accordance with the lighting conditions; shutter release means cooperating with a shutter of the camera for releasing the shutter to make an exposure when said shutter release means is actuated; manually operable means cooperating with said automatic setting means for releasing the latter to automatically set the camera when said manually operable means is actuated by the operator, said manually operable means also cooperating with said shutter release means to actuate the latter to make an exposure after the camera has been automatically set by said automatic setting means; and self-timer means movable at the option of the operator between an inoperative position where said self-timer means has no influence on the operation of the camera and an operative position where said self-timer means cooperates with said shutter release means to delay actuation thereof by said manually operable means for a given period of time, said self-timer means including an escapement wheel and an anchor cooperating therewith, and said self-timer means when moved by the operator from said inoperative to said operative position thereof moving said anchor away from said escapement wheel and maintaining said anchor out of engagement with said escapement wheel until said self-timer means starts to operate.

12. In a camera, in combination, automatic means for automatically setting the camera to make an exposure in accordance with the lighting conditions; release means for releasing a shutter of the camera to make an exposure; manually operable means cooperating with said automatic setting means and with said release means for actuating said automatic setting means to automatically set the camera in accordance with the lighting conditions and for actuating said release means to release the shutter to make an exposure after the camera has been automatically set according to the lighting conditions by said automatic setting means; self-timer means movable, at the option of the operator, between an inoperative position where it has no influence on the operation of the camera and an operative position where said self-timer means cooperates with said release means to delay actuation of said release means by said manually operable means for a predetermined period of time; and means for holding the setting of the camera, made by said automatic setting means, during the time when said self-timer means delays actuation of said release means.

References Cited by the Examiner
UNITED STATES PATENTS

| | | | |
|---|---|---|---|
| 2,938,445 | 5/60 | Strutynski | 95—53.6 |
| 2,990,758 | 7/61 | Sauer | 95—10 |
| 3,037,437 | 6/62 | Rentschler | 59—10 |

NORTON ANSHER, *Primary Examiner.*

D. B. LOWE, *Examiner.*